United States Patent
Gyöngyösi et al.

[11] Patent Number: 5,864,926
[45] Date of Patent: Feb. 2, 1999

[54] SPRING BAND CLAMP

[75] Inventors: Jürgen Gyöngyösi, Hanau; Bernd Beicht, Gross-Umstadt; Werner Ruppert, Büdingen; Ralf Spors, Bruchköbel, all of Germany

[73] Assignee: Rasmussen GMBH, Maintal, Germany

[21] Appl. No.: 923,889

[22] Filed: Sep. 4, 1997

[30] Foreign Application Priority Data

| Sep. 9, 1996 | [DE] | Germany | 196 36 495.7 |
| Oct. 15, 1996 | [DE] | Germany | 196 42 454.2 |
| Nov. 18, 1996 | [EP] | European Pat. Off. | 96118438.9 |
| Mar. 4, 1997 | [EP] | European Pat. Off. | 97103536.5 |

[51] Int. Cl.$^6$ ............ B65D 63/02; F16L 33/02
[52] U.S. Cl. ............ 24/20 R; 24/20 CW; 24/19; 24/23 EE
[58] Field of Search ........ 24/20 R, 19, 20 CW, 24/20 TT, 23 EE, 22, 23 R; 285/367, 406

[56] References Cited

U.S. PATENT DOCUMENTS

| 2,472,172 | 6/1949 | Ovens | 24/20 R |
| 4,425,681 | 1/1984 | Illius | 24/20 S |
| 4,674,720 | 6/1987 | Fetsch | 24/23 EE X |
| 4,713,863 | 12/1987 | Jennings | 24/23 EE X |
| 4,773,129 | 9/1988 | Muhr | 24/20 R |
| 4,858,279 | 8/1989 | Kato et al. | 24/20 R |
| 4,930,191 | 6/1990 | Takahashi | 24/20 R |
| 4,930,192 | 6/1990 | Muhr | 24/20 R |
| 4,969,240 | 11/1990 | Sauer | 24/20 R |
| 5,145,218 | 9/1992 | Worley et al. | 24/19 X |
| 5,185,907 | 2/1993 | Kawashima et al. . | |
| 5,203,809 | 4/1993 | Oetiker | 24/20 R |
| 5,234,233 | 8/1993 | Fix . | |
| 5,283,931 | 2/1994 | Oetiker | 24/20 R |
| 5,353,478 | 10/1994 | Spors | 24/20 CW X |
| 5,390,395 | 2/1995 | Oetiker | 24/20 R |
| 5,414,905 | 5/1995 | Kimura | 24/20 R |
| 5,487,209 | 1/1996 | Oetiker | 24/20 R |
| 5,537,721 | 7/1996 | Oetiker | 24/20 R |
| 5,542,155 | 8/1996 | Kimura | 24/20 R |
| 5,596,790 | 1/1997 | Möller | 24/20 R X |
| 5,664,295 | 9/1997 | Kume et al. | 24/20 R |
| 5,706,557 | 1/1998 | Beicht | 24/20 CW X |

FOREIGN PATENT DOCUMENTS

| 0 303 505 | 2/1989 | European Pat. Off. . |
| 0 545 378 | 6/1993 | European Pat. Off. . |
| 0 713 993 | 5/1996 | European Pat. Off. . |

(List continued on next page.)

OTHER PUBLICATIONS

Abstract for DE 3041–106.
Abstract for CH 560–347.

*Primary Examiner*—Anthony Knight
*Assistant Examiner*—Robert J. Sandy
*Attorney, Agent, or Firm*—Darby & Darby

[57] ABSTRACT

A spring band clamp is comprised of an annular spring band having a first end portion and a second end portion. Each end portion has a spreading jaw that projects beyond a periphery of the spring band. The first end portion has a tongue spaced from the spreading jaw of the first end portion extending radially outwardly from a U-shaped incision in the first end portion and has a free end surface extending perpendicularly with respect to a direction of extension of the tongue. An abutment is formed by a radially inner edge of the free end surface of the tongue. The second end portion has a slot extending in a circumferential direction. The first end portion projects through the peripheral slot in the second end portion. The spring band exerts a closing spring force, which is directed in the circumferential direction. The closing spring force is greater in an open position of the spring band clamp than in an operative position. In the open position of the spring band clamp, a support surface of a free end of the spreading jaw of the second end portion bears, due to the closing spring force, against the abutment of the tongue. The support surface is disposed at an angle with respect to a radius of the clamp that intersects with a radially inner edge of the support surface. The spring band clamp is disengageable from the open position by relative radial movement of the end portions.

9 Claims, 8 Drawing Sheets

FOREIGN PATENT DOCUMENTS

| | | | | | |
|---|---|---|---|---|---|
| 30 41 106 | 9/1985 | Germany . | 44 24 046 | 1/1996 | Germany . |
| 36 33 486 | 5/1988 | Germany . | 44 41 439 | 5/1996 | Germany . |
| 39 00 190 | 8/1991 | Germany . | 1-3842 | 4/1989 | Japan . |
| | | | 5-0093 | 3/1993 | Japan . |
| | | | 560 347 | 3/1975 | Switzerland . |

SPRING BAND CLAMP

BACKGROUND OF THE INVENTION

1. Field of the Invention

The present invention relates to a spring band clamp that includes an annularly bent spring band having a first end portion and a second end portion. Each end portion has a spreading jaw that projects beyond the periphery of the spring band clamp to permit the spring band clamp to be opened. The first end portion projects through a peripheral slot in the second end portion. The spring band exerts a closing spring force component, which is directed in the peripheral direction. In the open position, the closing spring force is greater than it is in the operative position. In the open position, the first end portion bears, due to the closing spring force, against a support surface of the second end portion. A tongue, which is spaced from the spreading jaw of the first end portion, is pressed out of a U-shaped incision in the first end portion of the spring band and has a free end surface that extends perpendicularly with respect to a direction of extension of the tongue. The tongue bears against the support surface, which is disposed at the free end of the spreading jaw of the second end portion. The support surface is disposed at an angle with respect to a radius of the clamp that intersects a radially inner edge of the support surface. The tongue and the support surface can be brought out of contact by causing a relative radial movement of the end portions away from each other.

2. Discussion of the Related Art

Spring band clamps are used as a hose clamp for clamping a hose, for example, a cooling water hose or a fuel-line hose in a motor vehicle on a tube or tubular connection, which typically has a holding rib. An example of a spring band clamp is shown, for example, in German Reference DE 44 41 439 Al. To simplify the mounting of the hose on the tube, the spring band clamp is fixed on the hose, in the open position, at the hose or clamp manufacturer before the hose is connected to the tube. The open position is achieved by expanding the spring band clamp, for example, with a pair of pliers. The pliers engage the spreading jaws, so that a support means engages behind a support surface. Thus, the spring band clamp is prevented from contracting. During the mounting operation, the hose, together with the clamp, which is in the opened condition, is pushed onto the tube. The spreading jaws are then pressed radially away from each other until the support means and the support surface disengage. The spring band clamp then contracts, due to its closing spring force, around the hose, thereby firmly clamping the hose on the tube.

The end surface of the radially extending outer spreading jaw, which is disposed at the free end of the second end portion of the spring band, extends at a right angle with respect to a tangential direction of the circumferentially extending outward and inward sides of the spreading jaw. The end surface at the free end of the tongue, on the other hand, is bevelled. This bevelled surface is difficult to produce. In addition, the spreading jaw of the second end portion extends radially outwardly at an acute angle relative to the tangential direction. The spreading jaw and the tongue, therefore, project relatively far outwardly in the radial direction, which constitutes an impediment. Furthermore, there is the risk that, for example, during transport or in the course of handling, the spring band clamp can be accidently released from its opened condition (i.e., disengaged). The spring band clamp can be disengaged, for example, by impacting the spreading jaw of the second end portion, causing the spring band clamp to contract abruptly under the effect of its spring force. During such unintentional closing, the spring clamp can fly away like a missile and injure people, damage objects and/or become lost.

SUMMARY OF THE INVENTION

Accordingly, it is an object of the present invention to provide a spring band clamp that can be produced at low cost and has a relatively low risk of unintentionally closing from the open position. This object is achieved in accordance with the present invention by forming an abutment on a radially inner edge of a free end surface (i.e., an abutment) of a tongue of a first end portion. The end surface of the tongue bears against a support surface of a free end of a second end portion. The support surface is disposed at an acute angle with respect to a radius of the clamp that intersects a radially inner edge of the support surface.

The abutment and the support surface according to the present invention will not accidentally disengage from the open position by virtue of an unintentional force that acts on one of the end portions radially from the outside, because such a force will cause the abutment to move, due to the clamping force of the spring band clamp, in the radial outward direction, which is opposite to the opening direction.

The tongue, which forms the abutment surface, can be produced relatively easily. For example, the tongue can be formed by cutting a U-shaped incision in the first end portion and, thereafter, bending the cut portion radially outwardly at an inclined angle. Thus, there is no need to machine the free end surface of the tongue.

The support surface is preferably formed by the bottom portion (i.e., the radial inner portion) of a groove, which is disposed in the free end of the spreading jaw of the second end portion. The groove, thus, guides and axially secures the tongue in position when the spring band clamp is in the open position.

The spreading jaw of the second end portion bears against the first end portion at a position radially outside of a periphery of the spring band clamp. But, in the open position of the spring band clamp, the spreading jaw and the tongue do not project relatively far in the radial outward direction. If the spreading jaw is unintentionally pressed radially inwardly by, for example, an accidental force that is applied radially inwardly, the support surface and the abutment will not disengage from each other. Thus, the spring band clamp will not accidentally close or contract from the open position.

The support surface is formed by an end surface of a second tongue. The second tongue is preferably bent radially outwardly out of a free end of the spreading jaw of the second end portion. The second tongue is formed between a pair of incisions that extend in the peripheral direction from the free end to a transverse limb, which defines a first end of a peripheral slot. The support surface is disposed perpendicularly with respect to the direction of extension of the free end of the tongue.

Thus, it is possible to form the support surface of the second tongue without machining. Therefore, the second tongue and its support surface can be formed, for example, by stamping.

The spreading jaw of the second end portion is preferably curved in a radial outward direction. This curved configuration makes it possible, by means of a simple tool, for example, a conventional screwdriver, to urge the spreading jaw of the second end portion radially outwardly relative to the first end portion of the spring band to release (i.e., disengage) the spring band clamp from the open position. To effect a disengagement, the blade of a screwdriver is inserted into the free space between the curvature of the spreading jaw of the second end portion and the first end portion. Afterward the screwdriver is turned to cause the end portions to move away from each other in the radial direction. Once disengaged, the spring band clamp, due to its own spring biasing force, is clamped firmly around the hose, which is to be clamped firmly to the tube.

In another preferred embodiment of the present invention, the spreading jaw of the second end portion is bent approximately into the shape of a semi-circle or a half-wave (hereinafter referred to as a "semi-circle"). The support surface is constituted by the outer surface of the free end section of the semi-circular portion of the second end section. Thus, no additional machining is required to produce the support surface. The bending process alone produces the desired angle of the support surface in the radial direction. Even if the spring band is relatively thin (e.g., 1/32" (0.8 mm) or less), the interlocking of the tongue and support surface in the open position will be secure. The semi-circular shape of the second end section will not adversely affect the functionality of the spreading jaw because the outer surface thereof, which the tongue and clamping tool push against, extends for a relatively small angle with respect to the extension of this curved portion in the radial direction.

The semi-circular portion preferably radially projects beyond the spreading jaw of the first end section. The circumferential slot in the second end section preferably extends to a point near the crest of the semi-circular portion. An inside surface of the end section of the semi-circular portion is preferably shaped to form a stop surface for the spreading jaw of the first end section to prevent the clamp from being opened beyond a predetermined admissible degree. A gap of sufficient size is disposed between the spreading jaw of the first end section and the end of the circumferential slot to insert a tool, such as a screwdriver, to close the spring band clamp.

The free end section of the semi-circular portion protrudes radially inwardly and has a hole therethrough that is disposed radially outwardly from the tongue when the clamp is in the open position. The hole can be engaged by a clamping tool, such as the one disclosed in German Reference DE 39 00 190 A1.

BRIEF DESCRIPTION OF THE DRAWINGS

The above and still further objects, features and advantages of the present invention will become apparent upon consideration of the following detailed description of a specific embodiment thereof, especially when taken in conjunction with the accompanying drawings wherein like reference numerals in the various figures are utilized to designate like components, and wherein.

DETAILED DESCRIPTION OF THE PREFERRED EMBODIMENT

Referring now to FIGS. 1–19, a clamp is shown. The clamp is preferably made from spring steel. The clamp is a hose clamp for clamping a hose 5 on a tube or a tubular connection. For example, the hose may be a cooling water hose or a fuel line hose in a motor vehicle.

Figure 1:
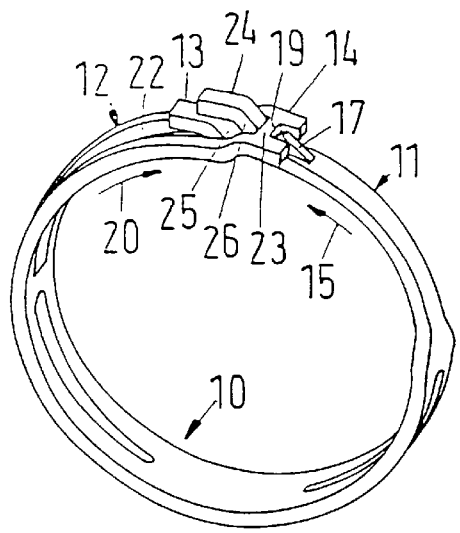
FIG. 1 is a perspective view of a first embodiment of a spring band clamp according to the invention shown in the open position.
Figure 2:
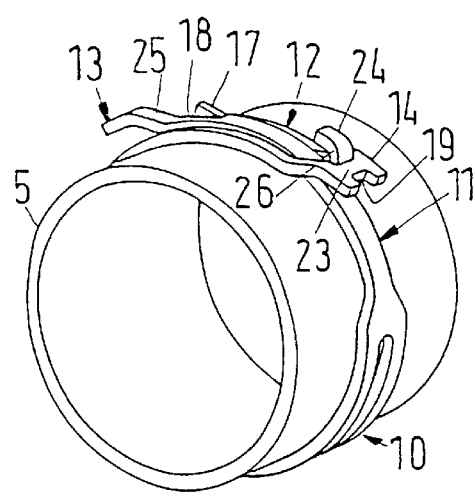
FIG. 2 is a perspective view of the first embodiment of the spring band clamp shown in the closed position on a hose.
Figure 3:
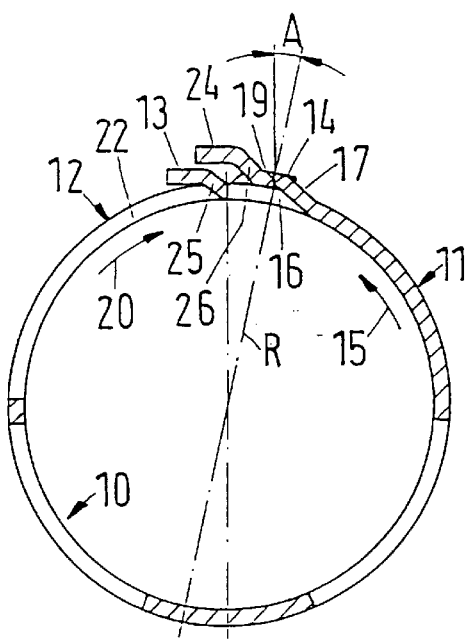
FIG. 3 is a cross-sectional view of the first embodiment of the spring band clamp shown in the open position.
Figure 4:
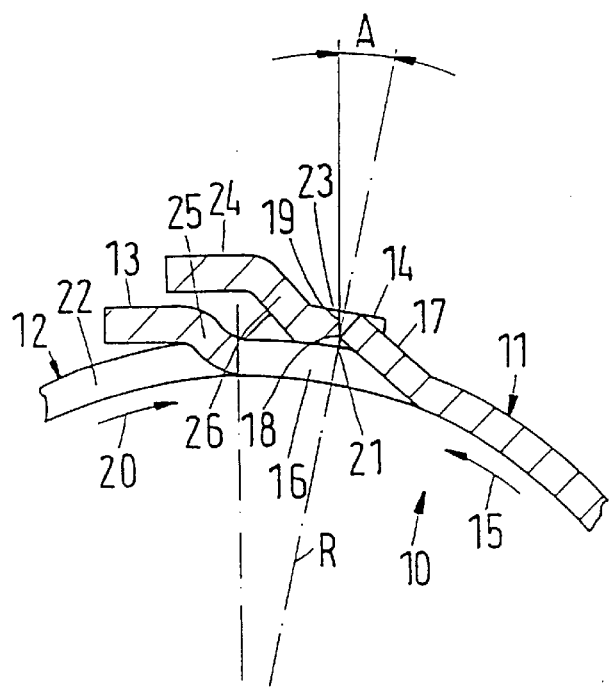
FIG. 4 is a view of a portion of FIG. 3 on an enlarged scale.

The spring band clamp is comprised of an annularly bent spring band 10 having a first end portion 11 and a second end portion 12. A spreading jaw 13 is disposed on the first end portion 11. Spreading jaw 13 is bent radially outwardly and extends in the peripheral direction. A spreading jaw 14 is disposed on the second end portion 12. Spreading jaw 14 is also bent radially outwardly and extends in the peripheral direction. Spreading jaws 13 and 14 are used to open the spring band clamp from a contracted and relaxed (or substantially relaxed) condition as shown in FIG. 2 in which the diameter of the spring band clamp is smaller than in the opened condition, to the opened condition which is shown in FIGS. 1, 3 and 4.

A tongue 17 is disposed on the first end portion 11. Tongue 17 is located behind spreading jaw 13 as viewed in the closing direction, which is indicated by arrow 15. Tongue 17 is pressed out of a U-shaped incision 16 in first end portion 11 and extends in the closing direction 15. Tongue 17 is inclinedly radially outwardly at an acute angle relative to a tangential direction of the spring band clamp. The free end of the tongue 17 has an end surface which is perpendicular to the direction of extension of tongue 17. A radially inner edge of the end surface forms an abutment or support means 18 (see FIG. 4). In the open position, abutment 18 bears against a support surface 19 formed in the free end of spreading jaw 14 due to the closing spring force component of the first end portion 11, which is directed in the peripheral direction 15 and the closing spring force component of the second end portion 12, which is directed in the opposite peripheral direction, as indicated by arrow 20.

Support surface 19 is formed in a lower (or radially inward) portion of a groove that is disposed in the free end of spreading jaw 14. Support surface 19 is formed at an acute angle A with respect to a radius R of the clamp. Radius R intersects the radially inner edge of support surface 19.

First end portion 11 is somewhat narrower than second end portion 12 and passes from a position radially inside of portion 12 to a position radially outside of portion 12 through a peripheral slot 22 in the second end portion 12. A first end of slot 22 is delimited by a transverse limb 23 formed in spreading jaw 14. A projection 24 is formed on transverse limb 23. Projection 24 initially extends at an inclined angle in the radial outward direction for a predetermined distance and, thereafter, extends tangential to a circumferential direction.

When the spring band clamp is in a completely relaxed condition (not shown) or in a partially relaxed condition, as shown in FIG. 2, tongue 17 is disposed in the region of the peripheral slot 22. To move the spring band clamp, against the spring force of the spring band 10, from the completely relaxed position (not shown) in which it is not yet disposed around the hose 5 into the illustrated "pre-opened" or open position, as shown in FIGS. 1, 3 and 4, the spreading jaws 13 and 14 are pressed together in the peripheral direction in opposite relationship to the direction of the arrows 15 and 20, respectively. Spreading jaws 13, 14 can be moved, for example, by means of a pair of pliers, which are positioned adjacent to the free ends of the spreading jaws, until the transverse limb 23 slides over tongue 17. When the pliers are removed, the spring band clamp contracts until support means 18 and the support surface 19 bear against each other. The spring band clamp is now in the open position.

To clamp a hose 5 firmly on a tube, the open spring band clamp is first placed on the hose, and, thereafter, the hose and clamp are pushed onto a tube. The spring band clamp can now be moved from the open position to the closed or partially relaxed position. In other words, the spring band clamp is disengaged. To move the spring band clamp in this manner, it is only necessary to insert the blade of a conventional screwdriver between spreading jaw 13 and projection 24, and, thereafter, turn the screwdriver. When the blade of the screw driver is turned, the transverse limb 23 is caused to move in a radially outward direction away from tongue 17, thus causing the support means 18 and the support surface 19 to come out of contact with each other (i.e., disengage) thereby causing the spring band clamp to fly contract around the hose, which causes a fixed or fast connection between the hose and the tube.

Because, when the clamp is in the open position, the front edge 18 of tongue 17 bears against the support surface 19, which is inclined at the acute angle A relative to the radius R, and the spreading jaw 14 bears radially outwardly against end portion 11, during transportation or handling, the support means 18 and the support surface 19 will not unintentionally disengage from one another even if impacted by an unintentional force applied radially from an external source against the projection 24, spreading jaw 14 and/or tongue 17. Of course, an unintentional disengagement would cause the clamp to contract abruptly. The inclined support surface 19 ensures that the support means 18 will be biased, due to the clamping force, in the radial outward direction, which is opposite to the opening direction. Thus, the spreading jaws 13 and 14 are more firmly held together in the open position as compared to conventional clamps.

Tongue 17 can be very easily produced because after the U-shaped incision 16 has been formed in end portion 11, tongue 17 only needs to be bent radially outwardly into an inclined position, without any necessity to machine the end surface of tongue 17. A groove in the free end surface of spreading jaw 14 guides and axially secures tongue 17 in position when the clamp is in the open position.

If the spreading jaws 13 and 14 are urged together in the peripheral direction of the arrows 15, 20 beyond the open position shown in FIGS. 1, 3 and 4, the inclined portions 25 and 26 of spreading jaws 13 and 14, respectively, and projection 24, which are relatively close together in the open position, bear against each other so that the spring band clamp cannot be opened beyond a predetermined admissible degree.

Figure 5:
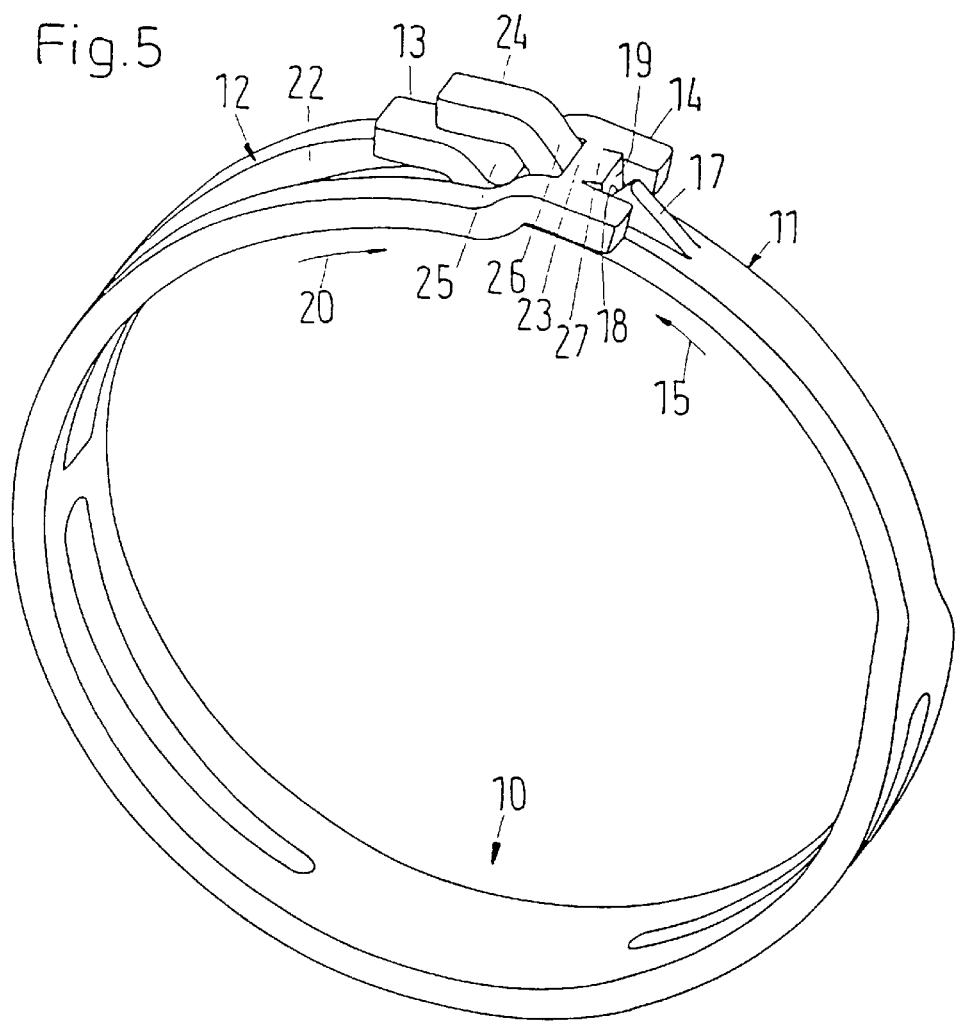
FIG. 5 is a perspective view of a second embodiment of a spring band clamp according to the invention shown in the open position.
Figure 6:
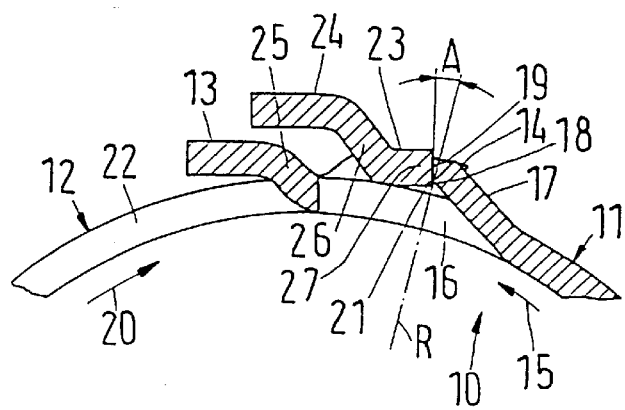
FIG. 6 is a view of a portion of FIG. 5, shown in a cross-section.

The embodiment shown in FIGS. 5 and 6 differs from the first embodiment of FIGS. 1–4 only in that the support surface 19 is formed by the end surface of a second tongue 27. Tongue 27 is bent radially outwardly out of the free end of spreading jaw 14 between a pair of incisions that extend in the peripheral direction from the free end to the transverse limb 23. Support surface 19 is disposed perpendicularly with respect to the direction of extension of the free end of tongue 27. Thus, it is possible to manufacture surface 19 without machining, while still maintaining angle A at least as large as in the first embodiment.

Figure 7:
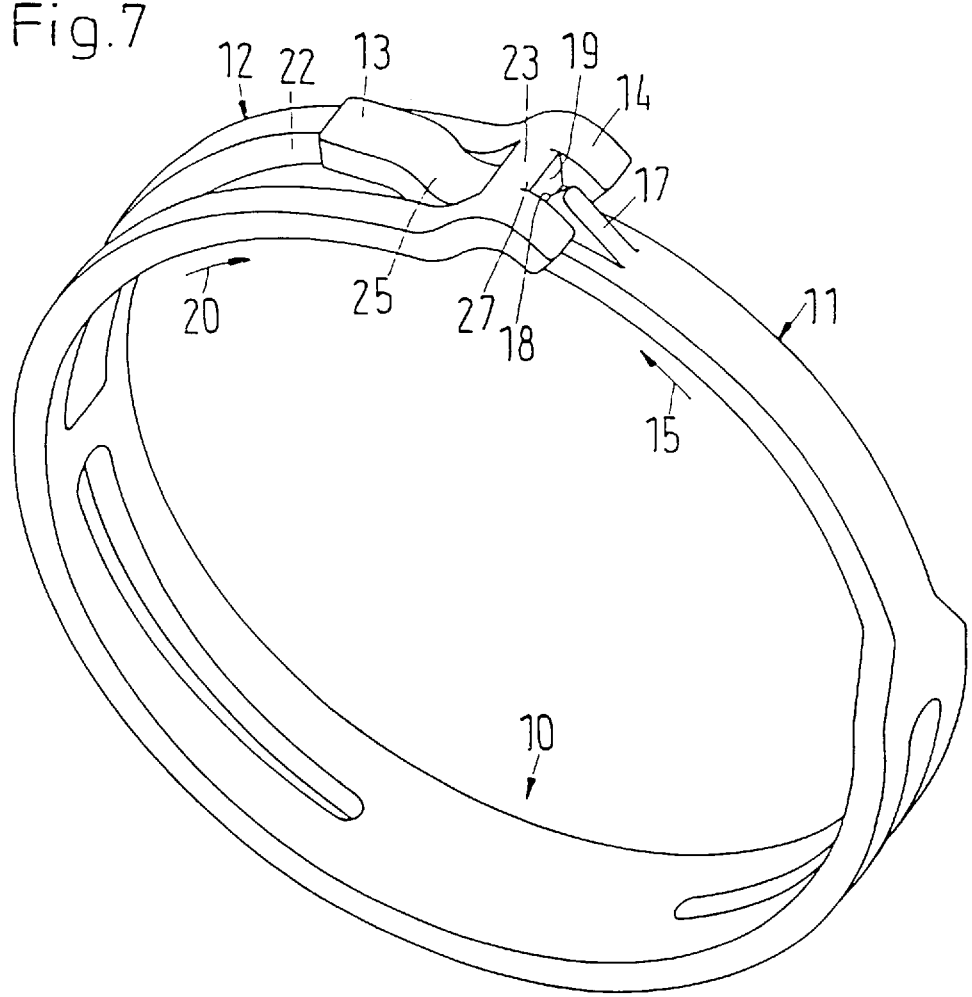
FIG. 7 is a perspective view of a third embodiment of a spring band clamp according to the invention shown in the open position.
Figure 8:
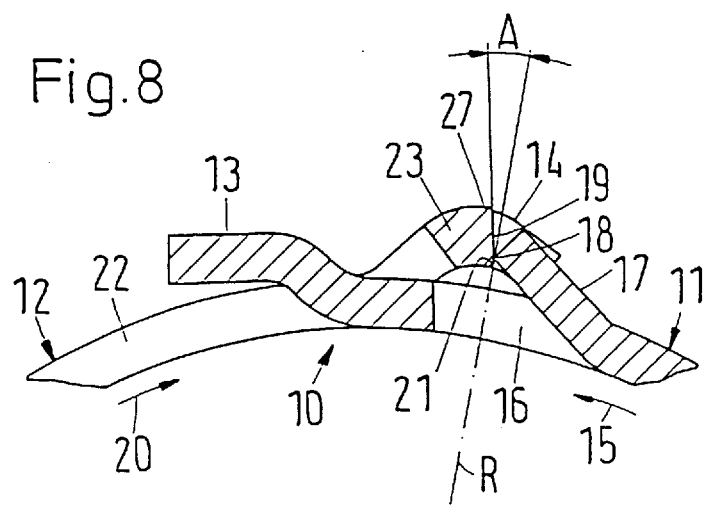
FIG. 8 is a view of a portion of FIG. 7, shown in cross-section.

The third embodiment shown in FIGS. 7 and 8 differs from the second embodiment shown in FIGS. 5 and 6 substantially only in that the spreading jaw 14 is curved radially outwardly and projection 24 is omitted. To disengage the spring band clamp from the open position, which is shown in FIGS. 7 and 8, into the closed condition (as shown in FIG. 2), it is also only necessary to insert the blade of a conventional screwdriver, which is preferably to be operated manually, into the free space between the transverse limb 23 of the spreading jaw 14 and the first end portion 11, and turn. The turning of the screwdriver causes the transverse limb 23 to be urged radially outwardly to a position beyond tongue 17 so that support means 18 and support surface 19 disengage from one another, thereby causing the spring band clamp to contract firmly around a hose. Projection 24, which was provided in the first embodiment, is, thus, not required to disengage support means 18 from support surface 19. This embodiment has the advantage that the contour of the spring band clamp is smaller both in the open condition and in the closed condition, and there is no risk of accidentally hooking projection 24 on to other objects during transportation or handling, thereby further reducing the risk of closing the pre-opened spring band clip accidentally.

Figure 9:
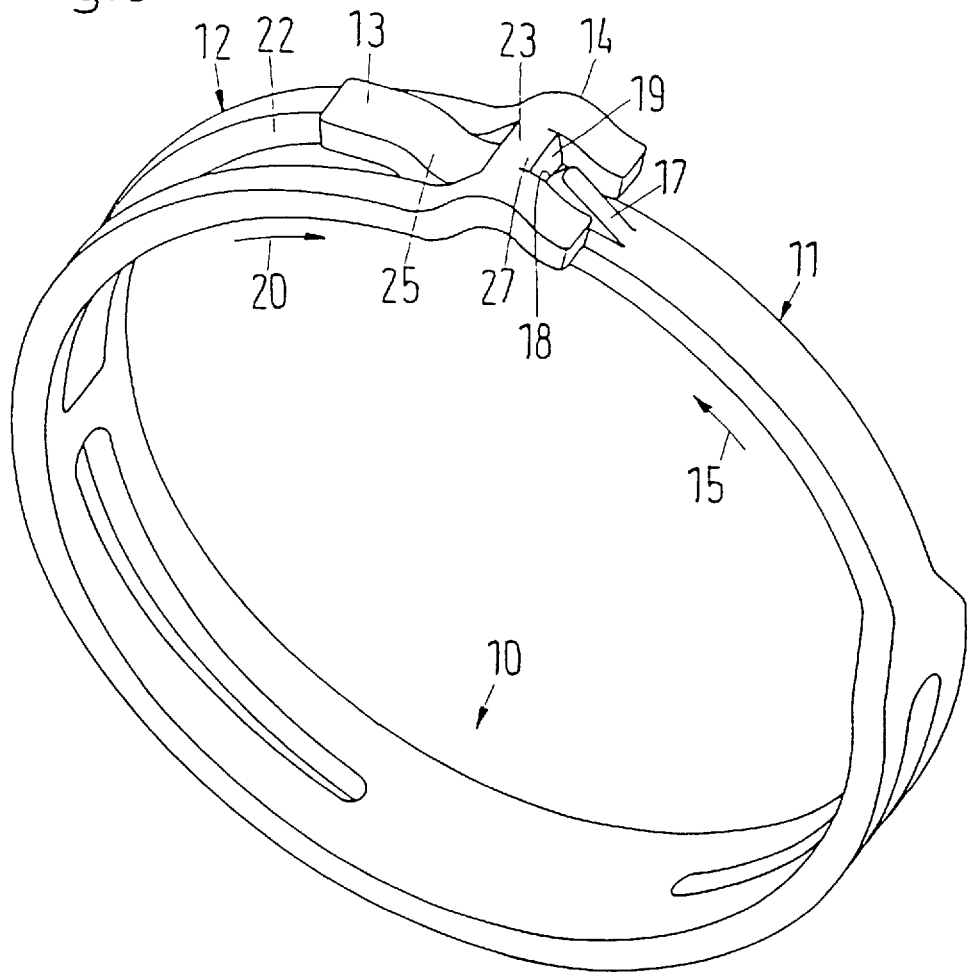
FIG. 9 is a perspective view of a fourth embodiment of a spring band clamp according to the invention shown in the open position.
Figure 10:
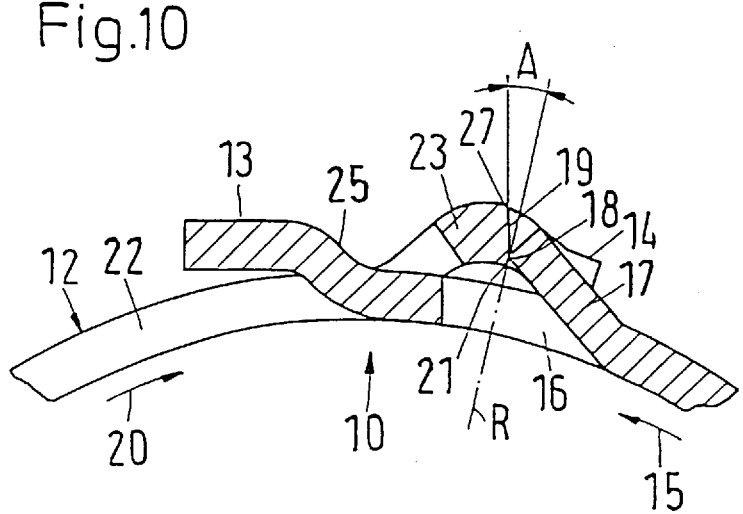
FIG. 10 is a view of a portion of FIG. 9, shown in cross-section.

The embodiment shown in FIGS. 9 and 10 differs from that shown in FIGS. 7 and 8 only in that the groove in the free end of the spreading jaw 14 is somewhat longer so that the limbs on both sides of the groove can be bent over somewhat radially outwardly. Spreading jaw 14, therefore, has a relatively larger engagement surface area for a clamping tool (e.g., a pair of pliers) at the free ends of the limbs.

Figure 11:
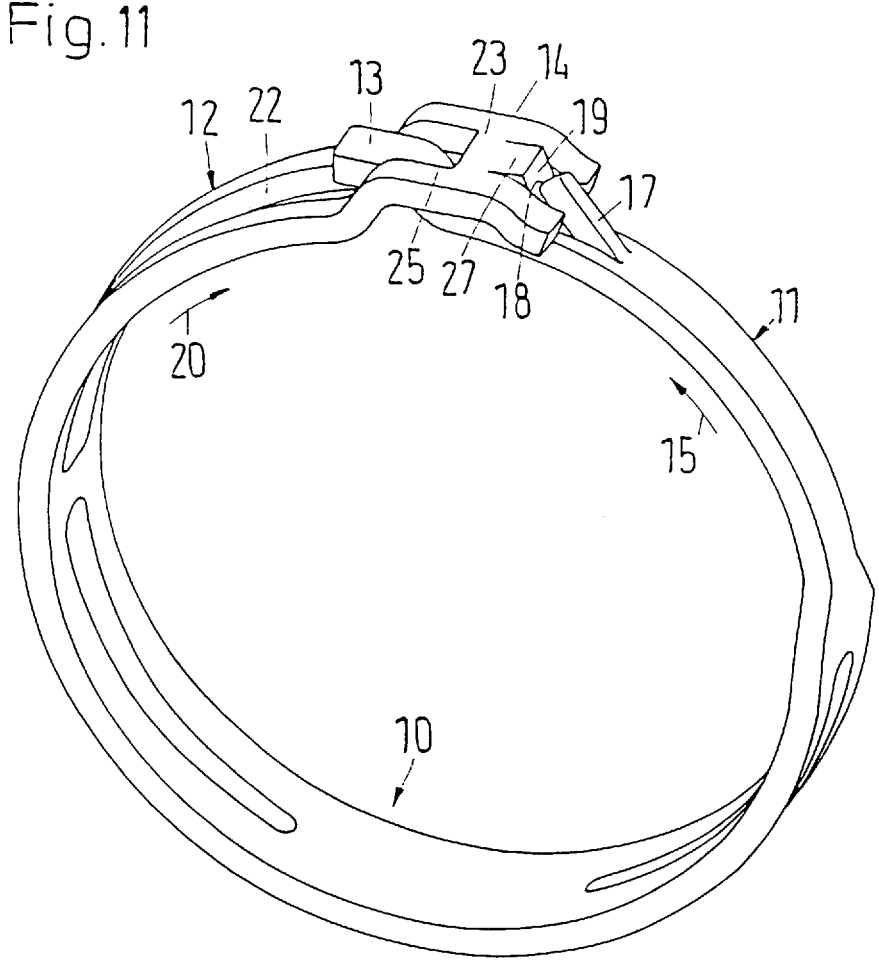
FIG. 11 is a perspective view of a fifth embodiment of a spring band clamp according to the invention shown in the open position.
Figure 12:
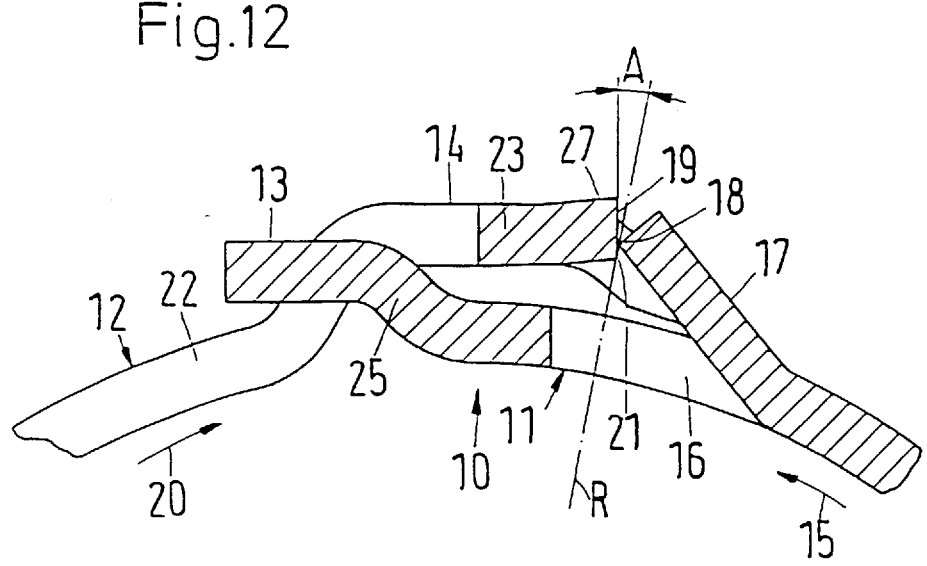
FIG. 12 is a view of a portion of FIG. 11, shown in cross-section.

The embodiment shown in FIGS. 11 and 12 differs from that shown in FIGS. 9 and 10 only in that the curvature of the spreading jaw 14 is not round but is of an approximately trapezoidal configuration. As shown in FIG. 12, this configuration provides a relatively larger free space between the spreading jaw 14 and the first end portion 11 of the spring band 10 for insertion of a release tool.

Figure 13:
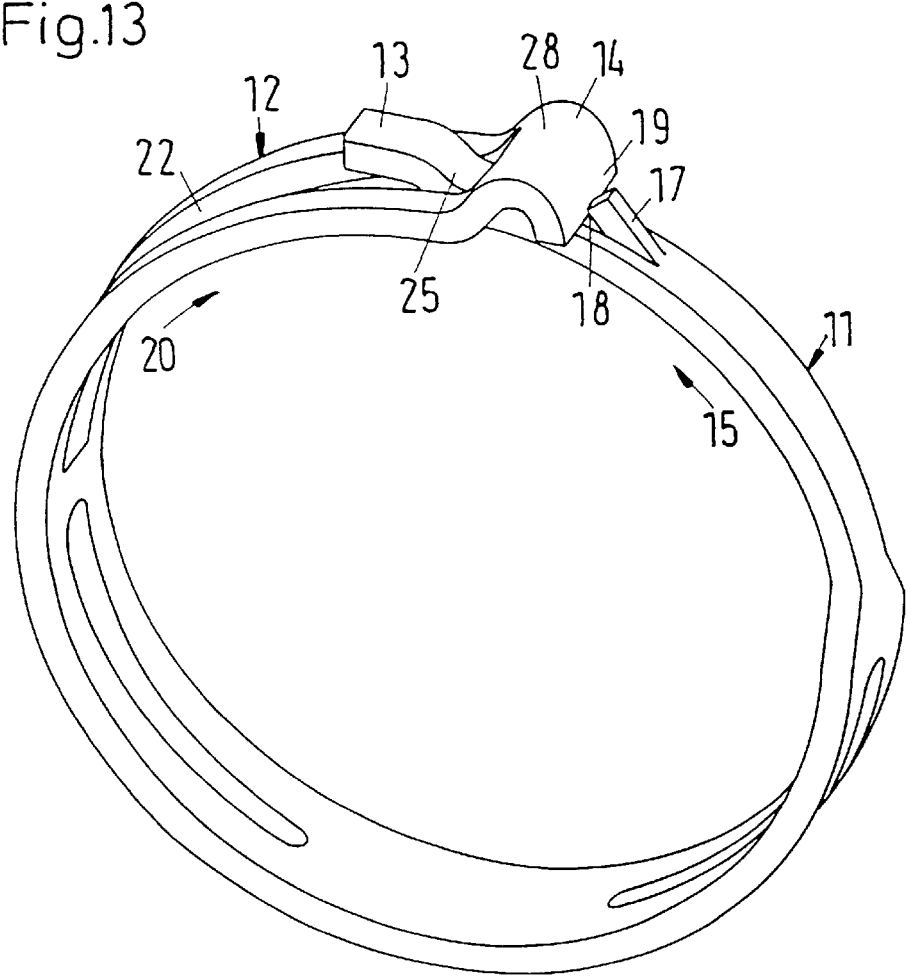
FIG. 13 is a perspective view of a sixth embodiment of a spring band clamp according to the invention shown in the open position.
Figure 14:
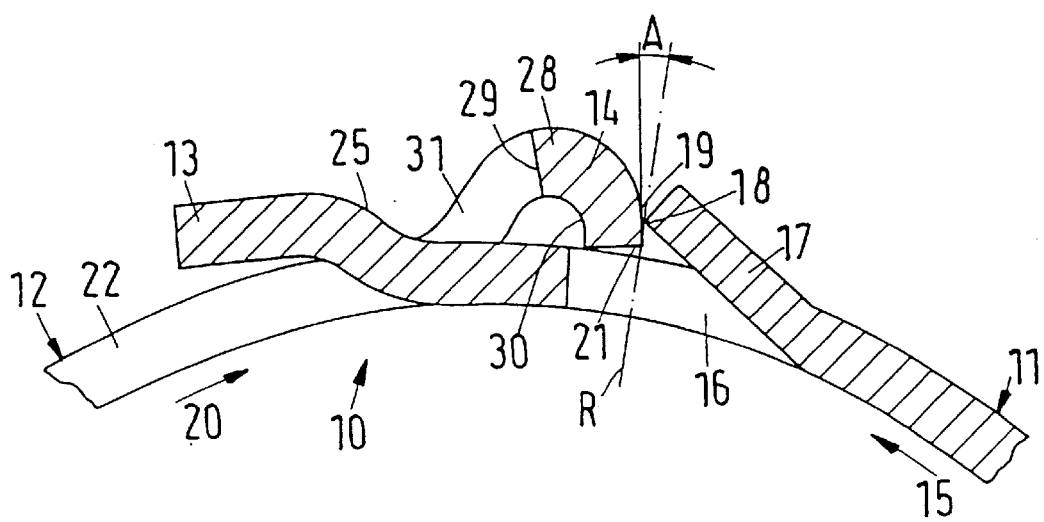
FIG. 14 is a view of a portion of FIG. 13, shown in cross-section.
Figure 15:
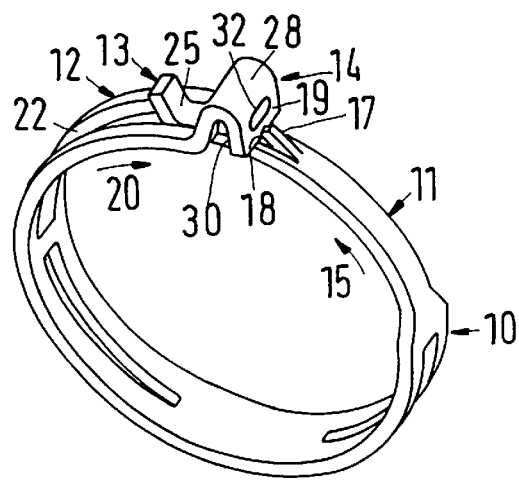
FIG. 15 is a perspective view of a seventh embodiment of a spring band clamp according to the invention, shown in the open position.
Figure 16:
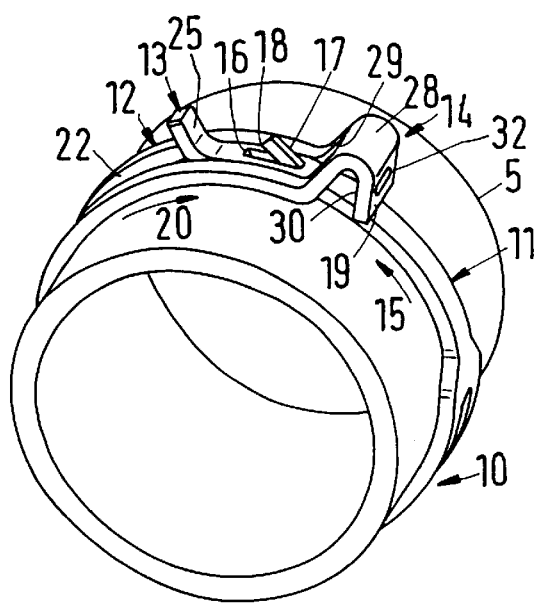
FIG. 16 is a perspective view of the spring band clamp of FIG. 15, shown in the closed position on a hose.
Figure 17:
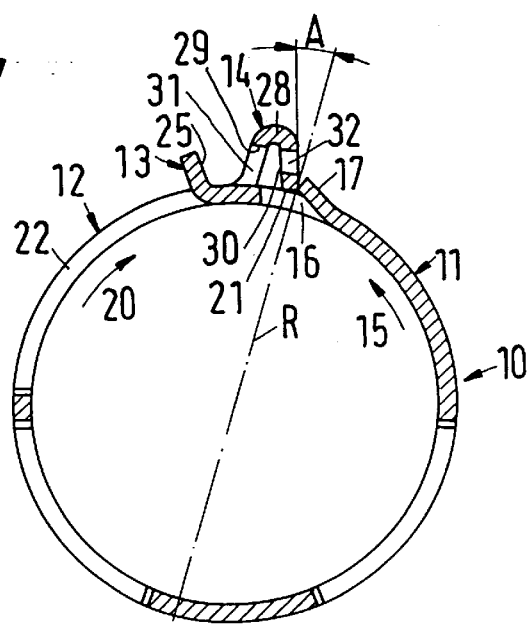
FIG. 17 is a cross-sectional view of the spring band clamp of FIG. 15, shown in the open position.
Figure 18:
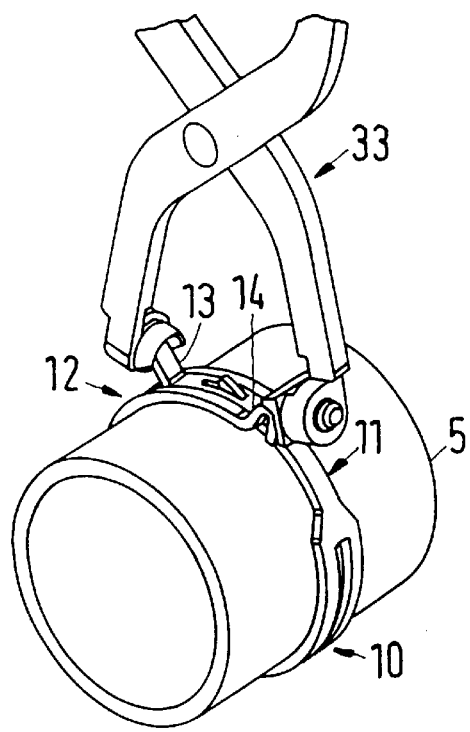
FIG. 18 is a perspective view of the spring band clamp of FIG. 15, with a spreading tool engaging the spreading jaws of the clamp.
Figure 19:
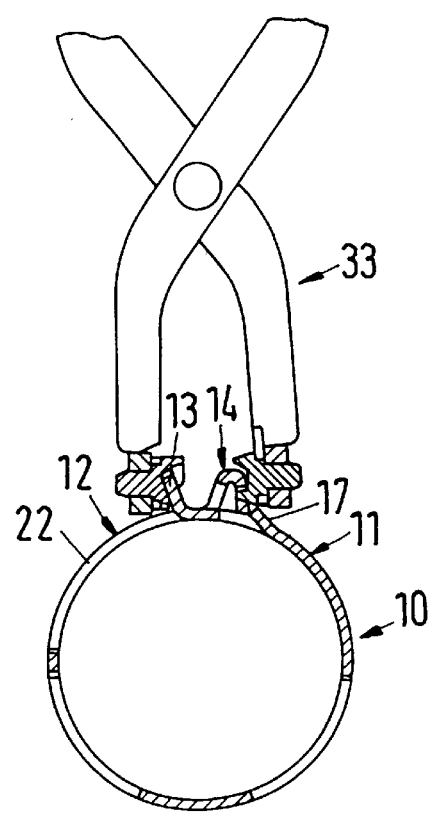
FIG. 19 is a cross-sectional view of the spring band clamp of FIG. 15, with the spreading jaws moved into the open position by the spreading tool.

The embodiment shown in FIGS. 13 and 14 differs from that shown in FIGS. 11 and 12 in that the free end of spreading jaw 14 is bent, approximately in the shape of a semi-circle 28, so that it radially protrudes outwardly. Support surface 19 is constituted by the outer surface of the free end section of the semi-circle 28. A simple bending process can be used to produce the semi-circular shape, without the need for any final machining to produce support surface 19. The angle A of support surface 19 relative to radius R is essentially identical to that of the preceding embodiments. Semi-circle 28 protrudes radially outwardly beyond spreading jaw 13 of the first end section 11. Circumferential slot 22 extends to a location that is close to the crest (i.e., the most radially outward location) of semi-circle 28. Thus, the end 29 of slot 22 is disposed radially outwardly from spreading jaw 13. Thus, as the two spreading jaws 13 and 14 are pressed toward each other beyond the open position with a clamping tool, the inner surface 30 of the end section of the semi-circle 28 bears against a sloped section 25 of spreading jaw 13 so that spring band clamp cannot be opened beyond a predetermined permissible degree. Thus, surface 30 acts as a stop for sloped section 25.

To disengage the spring band clamp from its open position, which is shown in FIGS. 13–15 and 17 into the closed position (FIG. 16), a suitable tool, such as, for example, a screwdriver, is inserted in slot or gap section 31 between the end 29 of slot 22 and spreading jaw 13. The turning of the screwdriver causes the front edge 18 of tongue 17 to move radially to a position underneath (i.e., radially inside of) edge 21 of spreading jaw 14, thereby permitting the peripheral closing spring force to move the clamp into the closed position.

Semi-circle 28 does not have any sharp edges that point radially outwardly. Also, semi-circle 28 is disposed radially outside of tongue 17 and spreading jaw 13, thereby providing, in the open position, a buffer effect. Semi-circle 28 preferably has a radiused shape in cross-section, as shown in FIGS. 13 and 14. However, semicircle 28 may have other configurations such as having a plurality of linear angled sections (e.g., semi-circle 28 may be trapezoidal-shaped in cross-section). However, the shape of semi-circle 28 must have an outer surface at the end section thereof that acts as a support surface and extends at an angle A relative to radius R.

The embodiment shown in FIGS. 15–19 differs from that shown in FIGS. 13 and 14 only in that the spreading jaw 13 extends, in conventional fashion, approximately radially outwardly. Additionally, the spreading jaw 14 forms a semi-circle or inverted U-shape 28, which protrudes radially beyond the spreading jaw 13 when in the open position. The free end section of semi-circle 28 protrudes radially inwardly and has a hole 32 therethrough that is positioned radially outwardly from tongue 17 in both the open and closed position. A spreading tool 33, which may be a conventional spreading tool 33 such as the one disclosed in German Reference DE 39 00 190 Al and shown in FIGS. 18 and 19, engages spreading jaws 13 and 14 to move the spreading jaws 13 and 14 into the open position. A portion of tool 33 is received in hole 32 to facilitate the use of tool 33.

Having described the presently preferred exemplary embodiment in accordance with the present invention, it is believed that other modifications, variations and changes will be suggested to those skilled in the art in view of the teachings set forth herein. It is, therefore, to be understood that all such modifications, variations, and changes are believed to fall within the scope of the present invention as defined by the appended claims.

What is claimed is:

1. A spring band clamp comprising:
an annular spring band having a first end portion and a second end portion, each end portion having a clamping jaw that projects beyond a periphery of said spring band, said first end portion having a tongue spaced from said clamping jaw of said first end portion and extending radially outwardly from a U-shaped incision in said first end portion and having a free end surface extending perpendicularly with respect to a direction of extension of said tongue, an abutment being formed by a radial inner edge of said free end surface of said tongue, said second end portion having a slot extending in a circumferential direction, said first end portion projecting through said slot in said second end portion, said spring band exerting a closing spring force which is directed in the circumferential direction, said closing spring force being greater in an open position of said spring band clamp than in an operative position; in the open position of the spring band clamp, a support surface of a free end of said spreading jaw of said second end portion bearing, due to the closing spring force, only against said abutment of said tongue, said support surface being disposed at an acute angle with respect to a radius of the clamp that intersects with a radially inner edge of said support surface such that said support surface is inclined circumferentially away from said free end surface of said tongue, said spring band clamp being disengageable from said open position by a relative radial movement of said end portions.

2. The spring band clamp according to claim 1, wherein said support surface is formed by the bottom of an open ended, radially extending groove in said free end of said spreading jaw of said second end portion.

3. The spring band clamp according to claim 1, wherein said spreading jaw of said second end portion bears against said first end portion at a position radially outside of said periphery of said clamp.

4. The spring band clamp according to claim 1, wherein said support surface is formed by an end surface of a second tongue that is bent radially outwardly from a free end of said spreading jaw of said second end portion, said second tongue being formed by a pair of incisions in said second end portion, said pair of incisions extending in said circumferential direction from said free end toward a transverse limb of said second end portion, said support surface being disposed perpendicularly with respect to a direction of extension of said free end of said tongue.

5. The spring band clamp according to claim 4, wherein said spreading jaws extend substantially tangentially relative to the circumferential direction of said spring band.

6. The spring band clamp according to claim 4, wherein said spreading jaw of said second end portion radially protrudes outwardly.

7. The spring band clamp according to claim 1, wherein said spreading jaw of said second end portion is bent into a semi-circular shape and said support surface is formed by the outer surface of said second end section along said semi-circular surface.

8. The spring band clamp according to claim 7, wherein said semicircular shape projects radially outwardly beyond said spreading jaw of said first end portion, said slot extends to a location adjacent a radially outermost portion of said semi-circular portion of said second end section, and an inner surface of said semicircular portion of said second end section forms a stop for said spreading jaw of said first end section so that said clamp cannot be opened beyond a predetermined permissible degree.

9. The spring band clamp according to claim 7, wherein said semi-circular portion of said second end section has a hole that is disposed radially outwardly from said tongue so that a spreading tool can engage said spreading jaw of said second end section.

* * * * *